United States Patent [19]

Lai et al.

[11] 4,435,561

[45] Mar. 6, 1984

[54] TEMPERATURE STABLE THERMOTROPIC POLY(ESTER CARBONATE) CONTAINING HIGH AMOUNTS OF READILY AVAILABLE DIOLS

[75] Inventors: Yu-Chin Lai; Bruce T. DeBona; Dusan C. Prevorsek; Murali K. Akkapeddi, all of Morris County, N.J.

[73] Assignee: Allied Corporation, Morris Township, Morris County, N.J.

[21] Appl. No.: 509,471

[22] Filed: Jun. 30, 1983

[51] Int. Cl.[3] .............................................. C08G 63/64

[52] U.S. Cl. .................................... 528/193; 528/184; 528/190; 528/191; 528/194

[58] Field of Search ............... 528/190, 191, 193, 194, 528/184

[56] References Cited

U.S. PATENT DOCUMENTS

| | | | |
|---|---|---|---|
| 4,284,757 | 8/1981 | Fayolle | 528/193 |
| 4,311,824 | 1/1982 | Fayolle | 528/193 |
| 4,398,018 | 8/1983 | Akkapeddi et al. | 528/193 |

*Primary Examiner*—Lester L. Lee

*Attorney, Agent, or Firm*—Alan M. Doernberg; Gerhard H. Fuchs

[57] ABSTRACT

Thermotropic poly(ester carbonates) such as the terephthalate/carbonate of a mixture of hydroquinose, resorcinol, tert-butylhydroquinone and methylhydroquinone. With a major proportion of the more readily available hydroquinone and resorcinol, thermotropic properties (liquid crystallinity in the melt) are observed.

10 Claims, No Drawings

TEMPERATURE STABLE THERMOTROPIC POLY(ESTER CARBONATE) CONTAINING HIGH AMOUNTS OF READILY AVAILABLE DIOLS

DESCRIPTION

BACKGROUND OF THE INVENTION

Polymers are known exhibiting liquid crystalline behavior either in solution or in the melt which contribute to desirable properties when formed into either highly ordered fibers or other fabricated structures. The most commonly used class are the aromatic polyamides, typified by poly(p-benzamide), which exhibit liquid crystalline behavior in certain solutions or dopes, and are thus known as lyotropic polymers. An exemplary disclosure of such polymers is U.S. Pat. No. 3,671,542 to Kwolek (June 20, 1972). These polymers are relatively easy to form, but are difficult to handle and must be cast into derived forms (fibers and films) from solution.

Certain aromatic polyesters are known which are liquid crystalline in the melt and are thus thermotropic. U.S. Pat. No. 4,140,846 to Jackson, Jr. et al. (Feb. 20, 1979), U.S. Pat. No. 3,890,256 to McFarlane et al. (June 17, 1975), U.S. Pat. No. 3,991,013 to Pletcher (Nov. 9, 1976), U.S. Pat. No. 4,066,620 to Kleinschuster et al (Jan. 3, 1978), U.S. Pat. No. 4,075,262 to Schaefgen (Feb. 21, 1978), U.S. Pat. No. 4,118,372 to Schaefgen (Oct. 3, 1978); U.S. Pat. No. 4,156,070 to Jackson, Jr. et al (May 22, 1979) and U.S. Pat. No. 4,159,365 to Payet (June 26, 1979) are representative of such thermotropic polyesters. Known polymers of this class must be formed by melt polymerization, and these polymers have not found wide use. These polyesters exhibit little, if any, solubility in most solvents.

One such thermotropic polyester is phenylhydroquinone terephthalate, as described in U.S. Pat. No. 4,159,365 to Payet. While this material has good low temperature properties, the phenylhydroquinone monomer is difficult to prepare and expensive. Furthermore, all of the known thermotropic polyesters lose their good properties at their glass transition temperature which also does not generally exceed 100° C.

Poly(ester carbonates) are a known class of polymers useful in a variety of articles where high performance is desirable. Such polymers are not, however, generally formed into fibers and are not known to exhibit the properties of the aromatic polyamides or other liquid crystalline material of either the lyotropic or thermotropic type. Such poly(ester carbonates) conventionally include as the principle dihydric aromatic alcohol a bisphenol such as bisphenol-A which would be regarded in a nomenclature of B. P. Griffin et al., British Polymer J. 147 (1980) as a nonlinear monomer and include carbonate moieties which are highly flexible.

Thermotropic poly(ester carbonates) are described in U.S. Pat. No. 4,284,757 to Fayolle (1981) containing methylhydroquinone as the preferred diol (optionally replaced up to 30% by hydroquinone) and various proportions of terephthalate and carbonate. While the monomers forming the terephthalate and carbonate moieties are readily available, methylhydroquinone (or its alternates, the chloro, bromo or ethyl compounds) are generally quite expensive. Furthermore, these poly(ester carbonates) have low glass transition temperatures and thus lose good mechanical properties on heating to 100° C.

Our own allowed U.S. application Ser. No. 333,328, filed Dec. 21, 1981 now U.S. Pat. No. 4,398,018, describes poly(ester carbonates) with tert-butylhydroquinone as the major diol, with improved properties at 100° C. and above. While this monomer is more readily available and less expensive than methylhydroquinone, it is still not as cheap as hydroquinone itself.

BRIEF DESCRIPTION OF THE INVENTION

A class of poly(ester carbonates) has been found which can be formed using high proportions of the readily available diols hydroquinone and resorcinol by melt condensation, and which furthermore are thermotropic and thus produce high strength fibers. Such polymers can be spun into fibers from the melt and can be oriented or otherwise upgraded by drawing, annealing or other conventional techniques used to improve the orientation and crystallinity of fibers. Furthermore, the thermotropic poly(ester carbonates) of this invention have glass transition temperatures of at least about 100° C., preferably at least about 130° C., which enables them to retain mechanical properties on heating to these temperatures.

Thus the present invention includes a poly(ester carbonate) polymer having diacyl moieties which are primarily terephthaloyl moieties, carbonate moieties and aromatic dihydroxy-derived moieties. In the improvement, the aromatic dihydroxy-derived moieties comprise a mixture of, by moles:

(a) about 60–20% benzene-1,4-dioxy,
(b) about 20–40% benzene-1,3-dioxy,
(c) about 30–5% methylbenzene-2,5-dioxy, and
(d) about 10–30% t-butylbenzene-2,5-dioxy.

This composition enables the greatest use of the most available hydroquinone and resorcinol monomers, and least use of the least available methylhydroquinone monomer. The intermediate monomer, tert-butylhydroquinone, is used in modest amounts. The poly(ester carbonates) of the present invention are liquid crystalline in the melt at least up to 20° C. above their melting point and have glass transition temperatures of at least 100° C. The polymers of the present invention can be formed as low molecular weight oligomers or polymers of sufficient molecular weight to form fibers.

DETAILED DESCRIPTION OF THE INVENTION

The poly(ester carbonate) polymers of the present invention have diacyl moieties, aromatic dihydroxy moieties and carbonate moieties. The carbonate moieties may be formed by reacting phosgene or by exchange of carbonate or haloformate monomers with various oligomers as is conventional. The diacyl moieties are primarily terephthaloyl and can be formed either from terephthalic acid or from terephthaloyl halide such as terephthaloyl chloride. Terephthalate diesters such as dimethyl terephthalate or diphenyl terephthalate (preferably the latter) may be used if the polymer is produced by melt condensation. Although the diacyl moiety should be primarily terephthaloyl, other diacyl moieties may be used as a relatively minor component, such as substituted terephthaloyl, isophthaloyl, 2,6-naphthalenedicarboxyl, 1,4-cyclohexanedicarboxyl and 1,3-cyclohexanedicarboxyl.

The aromatic dihydroxy moieties of the polymer of the invention should be primarily the four moieties listed in the Brief Description. Hydroquinone (1,4-dihydroxybenzene) is used to provide 60–20% of the aromatic dihydroxy-derived moieties, with about 30 to about 40% being preferred. Resorcinol is used to provide 20–40% of the aromatic dihydroxy-derived moieties, with about 30 to about 35% being preferred. Tert-butylhydroquinone is used to provide 10–30% of the aromatic dihydroxy-derived moieties, with about 10 to about 25% being preferred. Methylhydroquinone is used to provide between 5 and about 30% of the aromatic dihydroxy-derived moieties, with about 10 to about 20% being preferred.

In general, it is preferred that hydroquinone and resorcinol together constitute between about 55 and about 80% of the total, and that tert-butylhydroquinone and methylhydroquinone constitute about 20–45% of the total. It is also preferred that the t-butylhydroquinone represent 30–80% of the t-butylhydroquinone plus methylhydroquinone. Other substituted hydroquinones and other aromatic dihydroxies (e.g., substituted 4,4'-dihydroxies) may be used as minor constituents.

Where the terephthalate moieties are not the sole diacyl moieties used in the polymer, other aromatic dicarboxylic acid moieties may be used. Examples of such moieties include substituted terephthalates such as methyl-, chloro-, lower alkoxy (one to six carbons) or bromoterephthalate; isophthalate; 2,5-pyridine dicarboxylate; and 2,6-naphthalene dicarboxylate. Substituted forms thereof may also be used as minor components. While the present polymers may have solely carbonate, dihydric aromatic alcohol and diacyl moieties, it is contemplated to include other moieties, including hydroxyaromatic carboxylates such as 4-hydroxybenzoic acid or substituted forms thereof in minor proportions. For example, a polymer of t-butylhydroquinone:terephthalate:carbonate (2:1:1) can be modified by using hydroxybenzoic acid as a fourth component, whereby the ratio becomes, for example, 1.9:0.9:0.1 or 1.8:0.8:1:0.2. Hydroxyaromatic carboxylates are used primarily when the polymer is formed by melt condensation.

The polymers of the present invention are preferably formed by melt condensation. In this method the diacyl moieties may be introduced as diesters such as diphenylterephthalate and the carbonate moieties as diesters such as diphenylcarbonate. The materials are mixed in the melt with the mixture of dihydroxy compounds and optionally a suitable organometal catalyst such as lithium phenolate, aluminum isopropoxide or sodium methylate, and optionally hydroxybenzoic acid or one of its esters and heated to transesterify and remove the alcohol part of the esters (e.g. phenol) by evaporation.

In a modified melt condensation process, terephthalic acid is used in place of terephthaloyl chloride and the amount of diphenyl carbonate is increased by the molar amount of terephthalic acid (e.g. doubled if the desired final terephthalate:carbonate ratio is 1:1). By heating to one temperature, e.g. 200° C., at which transesterification occurs, the terephthalic acid is converted in situ to diphenyl terephthalate by conversion of the additional diphenyl carbonate to carbon dioxide and water (both of which are vented). The temperature is then raised to a suitable reaction temperature, e.g. 270° C., at which polymerization occurs or is completed, liberating phenol.

Once the polymers are formed, they may be purified, if required, by conventional technology. Prior to spinning, they may be heated to a temperature below their melting temperatures (e.g. to 220° C. or 240° C. or 250° C.) for a period (e.g. 0.5, 1.0 or 2.0 hours) to cause further increases in molecular weight. Thereafter the polymers can be spun or extruded into fibers, sheets or other fabricated forms using conventional techniques, including post-treatments such as drawing, heat treatments and the like. The thermotropic nature of the polymers increases the orientation of the fabricated forms, which manifests itself in improved physical properties, e.g. higher tensile modulurs for fibers.

In determining liquid crystallinity, the TOT procedure described in cols. 8–10 of U.S. Pat. No. 4,118,372 may be used. The results reported in the following Example 6 are based on visual observations with such a test, and not on quantitative measurement of light intensity.

An important feature of the thermotropic poly(ester carbonate) polymers of the present invention is their retention of properties when heated to 100° C. or above. When formed into oriented fibers or films, the properties most notably retained at elevated temperatures are tenacity and tensile modulus.

EXAMPLE 1

Hydroquinone (44.04 g, 0.40 mol), resorcinol (38.54 g, 0.35 mol), tert-butylhydroquinone (24.93 g, 0.15 mol), methylhydroquinone (12.41 g, 0.10 mol), diphenyl carbonate (107.36 g, 0.50 mol) and diphenyl terephthalate (159.16 g, 0.50 mol) were charged together with 0.22 g of tetrabutyl titanate to a resin kettle equipped with nitrogen gas inlet tube, distilling head, mechanical stirrer and thermometer. After heating to 160° C. under nitrogen in 45 minutes, the stirring was initiated. The temperature was then raised to 220° C. in another 30 minutes. At that temperature phenol started to distill out. The temperature continued to be raised while distilling; it reached 300° C. in 45 minutes. After that nitrogen flow was stopped and the system was brought to a vacuum of 2 mm Hg (270 kPa) in 10 minutes. Initially, the temperature dropped to 275° C., but it was brought back to 297° C. under vacuum. The pressure was reduced to 0.4 mm Hg (53 Pa) over the next hour; during that period the temperature rose to 305° C. The reaction was stopped and the molten polymeric material was then cooled down under nitrogen to room temperature and the solidified polymer (179 g) broken up and ground in a mill to yield a fine powder. The crude polymer was washed with boiling toluene, filtered and dried in a vacuum oven at 110° C. for three days. The purified product weighed 152 g.

EXAMPLES 2–13

Example 1 was repeated, using differing molar amounts of hydroquinone (HQ), resorcinol (RO), tert-butylhydroquinone (tBuHQ) and methylhydroquinone MHQ). Diphenylterephthalate and diphenylcarbonate were kept constant at 0.50 mole each. The proportions are shown in Table 1; also shown are the glass transition temperature (Tg) and melting temperature (Tm) measured for some of the materials as made or after heat treatment for 30 minutes at 240° C. or for 6 hours at 250° C.

TABLE 1

| | mole percent | | | | Initial | Heated | After Heating | |
|---|---|---|---|---|---|---|---|---|
| Ex | HQ | RO | tBuHQ | MHQ | Tg | At | Tg | Tm |
| 1 | 40 | 35 | 15 | 10 | 118 | 240° C. | 115 | 288 |
| 2 | 40 | 30 | 20 | 10 | 119 | 250° C.* | 127 | 328 |
| 3 | 35 | 35 | 15 | 15 | 122 | 250° C.* | 130 | 330 |
| 4 | 35 | 35 | 20 | 10 | 131 | 240° C. | 125 | 277 |
| 5 | 35 | 35 | 10 | 20 | | 240° C. | 120 | 287 |

TABLE 1-continued

| | mole percent | | | | Initial | Heated | After Heating | |
|---|---|---|---|---|---|---|---|---|
| Ex | HQ | RO | tBuHQ | MHQ | Tg | At | Tg | Tm |
| 6 | 35 | 30 | 20 | 15 | 122 | 240° C. | 119 | 290 |
| 7 | 35 | 30 | 15 | 20 | | 240° C. | 116 | 283 |
| 8 | 35 | 30 | 25 | 10 | 130 | 240° | 125 | 285 |
| 9 | 30 | 30 | 25 | 15 | 112 | 240 | 112 | 285 |
| 10 | 30 | 30 | 20 | 20 | (IV 1.66) | | | |
| 11 | 35 | 25 | 25 | 15 | | | | |
| 12 | 35 | 25 | 20 | 20 | | | | |
| 13 | 40 | 20 | 20 | 20 | (IV 1.17) | | | |

*for 6 hours

An aliquot of each of the polymers as made was dissolved in pentafluorophenol at 50° C. and an intrinsic viscosity was measured (these values varied from 0.87 in Example 9 to 1.65 in Example 10). In a few cases, the heat-treated product (at 240° C. for 30 minutes) was also dissolved in pentafluorophenol. The IV after heat treatment did not differ significantly (over 10%) under these conditions.

Demonstration of Optical Anisotropy In Melt

At the end of the above polymerizations, fibrous bifringent strands were observed in the stirred melt in all instances. In selected cases, the polymer, after work-up, was remelted and observed under a polarizer to be bifringent (anisotropic) in the melt.

What is claimed:

1. In a thermotropic poly(ester carbonate) having diacyl moieties which are primarily terephthalate moieties, carbonate moieties and dihydroxy-derived moieties, the improvement wherein the dihydroxy-derived moieties comprise a mixture of, by moles:

(a) about 60–20% benzene-1,4-dioxy, (b) about 20–40% benzene 1,3-dioxy, (c) about 30–5% methylbenzene-2,5-dioxy, and (d) about 10–30% t-butylbenzene-2,5-dioxy.

2. The thermotropic poly(ester carbonate) of claim 1 wherein benzene-1,4-dioxy and benzene-1,3-dioxy together comprise between about 55 and about 80% of the dihydroxy-derived moieties.

3. The thermotropic poly(ester carbonate) of claim 2 wherein benzene-1,4-dioxy is between about 30 and about 40% of the dihydroxy moieties and benzene-1,3-dioxy is between about 20 and about 35% of the dihydroxy-derived moieties.

4. The thermotropic poly(ester carbonate) of claim 2 wherein methylbenzene-2,5-dioxy and t-butyl benzene 2,5-dioxy together comprise between about 20 and about 45% of the dihydroxy-derived moieties.

5. The thermotropic poly(ester carbonate) of claim 4 wherein (tBuHQ)/(tBuHQ+MHQ)

is between about 0.3 and 0.8, with tBuHQ representing the molar percentage of t-butylbenzene-2,5-dioxy and MHQ representing the molar percentage of methylbenzene-2,5-dioxy.

6. The thermotropic poly(ester carbonate) of claim 2 wherein (tBuHQ)/(tBuHQ+MHQ)

is between about 0.3 and 0.8, with tBuHQ representing the molar percentage of t-butylbenzene-2,5-dioxy and MHQ representing the molar percentage of methylbenzene-2,5-dioxy.

7. The thermotropic poly(ester carbonate) of claim 1 wherein (tBuHQ)/(tBuHQ+MHQ)

is between about 0.3 and 0.8, with tBuHQ representing the molar percentage of t-butylbenzene-2,5-dioxy and MHQ representing the molar percentage of methylbenzene-2,5-dioxy.

8. The thermotropic poly(ester carbonate) of claim 1 wherein methylbenzene-2,5-dioxy and t-butyl benzene 2.5-dioxy together comprise between about 20 and about 45% of the dihydroxy-derived moieties.

9. The poly(ester carbonate) of claim 1 having a glass transition temperature between about 110° C. and about 140° C. and a melting temperature between about 260° and about 300° C. by DSC at 10° C./min in argon.

10. The poly(ester carbonate) of claim 9 having a glass transition temperature between about 120° C. and about 150° C.

* * * * *